US012642358B2

(12) United States Patent
Mei

(10) Patent No.: US 12,642,358 B2
(45) Date of Patent: Jun. 2, 2026

(54) VENTILATION PAD

(71) Applicant: Smart Technology Co., Ltd., Foshan (CN)

(72) Inventor: Jie Mei, Foshan (CN)

(73) Assignee: Smart Technology Co., Ltd., Foshan (CN)

( * ) Notice: Subject to any disclaimer, the term of this patent is extended or adjusted under 35 U.S.C. 154(b) by 350 days.

(21) Appl. No.: 18/398,130

(22) Filed: Dec. 27, 2023

(65) Prior Publication Data

US 2025/0031859 A1 Jan. 30, 2025

(30) Foreign Application Priority Data

Jul. 24, 2023 (CN) .......................... 202310915094.4

(51) Int. Cl.
B60N 2/56 (2006.01)
A47C 7/74 (2006.01)

(52) U.S. Cl.
CPC ................ A47C 7/744 (2013.01); B60N 2/56 (2013.01); B60N 2/5642 (2013.01)

(58) Field of Classification Search
CPC ........ A47C 7/744; B60N 2/56; B60N 2/5642; B60N 2/565; B60N 2/5657
See application file for complete search history.

(56) References Cited

U.S. PATENT DOCUMENTS

| | | | | | |
|---|---|---|---|---|---|
| 5,921,858 | A * | 7/1999 | Kawai | .................. | B60N 2/5642 |
| | | | | | 297/180.14 |
| 9,173,500 | B2 * | 11/2015 | Squires | .................. | A47C 7/744 |
| 9,192,532 | B2 * | 11/2015 | Primo | .................. | A61G 5/1045 |
| 9,731,639 | B2 * | 8/2017 | Jung | .................... | B60N 2/5657 |
| 10,589,647 | B2 * | 3/2020 | Wolas | .............. | B60H 1/00285 |
| 11,273,740 | B2 * | 3/2022 | Fujita | .................. | B60N 2/5657 |
| 11,639,816 | B2 * | 5/2023 | Cauchy | .................. | H10N 10/17 |
| | | | | | 62/3.7 |
| 2005/0200166 | A1 * | 9/2005 | Noh | ...................... | B60N 2/5657 |
| | | | | | 297/180.14 |
| 2016/0286971 | A1 * | 10/2016 | Pan | ...................... | A41D 13/0025 |
| 2023/0121196 | A1 * | 4/2023 | Kumar | ................ | B60N 2/5657 |
| | | | | | 297/180.14 |
| 2024/0409013 | A1 * | 12/2024 | Kojima | ................ | B60N 2/5685 |
| 2024/0416715 | A1 * | 12/2024 | Maeda | ............... | B60H 1/00457 |

FOREIGN PATENT DOCUMENTS

| | | | | | |
|---|---|---|---|---|---|
| CN | 104643679 | A | | 5/2015 | |
| CN | 104884303 | A * | 9/2015 | ........... | B60N 2/5685 |
| CN | 105476317 | A * | 4/2016 | ............... | B60N 2/66 |
| CN | 113619457 | A * | 11/2021 | ........... | B60N 2/5642 |

(Continued)

*Primary Examiner* — Timothy J Brindley

(57) ABSTRACT

Disclosed is a ventilation pad, which comprises a pad body and a ventilation assembly. An air supply chamber is arranged in the pad body. A quantity of vents feed through with the air supply chamber are arranged on the pad body. The ventilation assembly is arranged in the air supply chamber, and the ventilation assembly includes downward air outlets and upward air outlets, respectively. The ventilation pad of the present disclosure plays a good ventilation and dissipation effect to the back and waist of children and can be used not only in the ventilation back pad but also in the ventilation seat pad.

9 Claims, 6 Drawing Sheets

(56)     References Cited

FOREIGN PATENT DOCUMENTS

| CN | 217065888 | U | | 7/2022 | |
|---|---|---|---|---|---|
| CN | 217515023 | U | | 9/2022 | |
| CN | 116982817 | A | * | 11/2023 | ............ A47C 7/004 |
| CN | 222157249 | U | * | 12/2024 | |
| DE | 102014004175 | A1 | * | 9/2015 | ............ B60N 2/565 |
| EP | 4197856 | A1 | * | 6/2023 | ........... B60N 2/5678 |
| JP | 2017523073 | A | * | 8/2017 | ........... B60N 2/5657 |
| KR | 101610730 | B1 | * | 4/2016 | .............. A47C 7/74 |
| KR | 20180087730 | A | * | 8/2018 | .............. H05B 3/56 |
| KR | 102496241 | B1 | * | 2/2023 | ........... A47D 15/001 |
| KR | 20230165633 | A | * | 12/2023 | ............ A47C 7/744 |
| KR | 20240035245 | A | * | 3/2024 | ........... B60N 2/5657 |
| KR | 20240077239 | A | * | 5/2024 | ........... A47C 31/004 |

* cited by examiner

VENTILATION PAD

CROSS-REFERENCE TO RELATED APPLICATIONS

The present application claims priority to Chinese patent application no. 202310915094.4, filed on Jul. 24, 2023, the content of all of which is herein incorporated by reference.

TECHNICAL FIELD

The present disclosure relates to ventilation pad technical field, in particular to a ventilation pad.

BACKGROUND

With the continuous improvement of living standards, children's car seats, child carts, infant dining chairs and other supplies are used more and more widely, at the same time, people's requirements for the comfort of children's products are also getting higher and higher, such as hope that children take the above children's products in the hot summer more comfortable, not easy to sweat.

A ventilation pad is a kind of product that can realize the space circulation between the bearer and the contact surface of the sitting device. Therefore, the ventilation pad is usually used with children's products such as child car seats, child carts and infant dining chairs. The Chinese patent application CN202122797949.7 discloses a ventilation pad, the heat dissipation device on the ventilation pad is easy to remove, but when the heat dissipation device is working, the heat dissipation device can only go in one direction to the air supply channel inside the ventilation pad body. Due to the limited wind coverage of the heat dissipation device, the air volume of the vent hole far away from the heat dissipation device on the ventilation pad is small. When children contact with the back of the ventilation pad, the ventilation and heat dissipation effect of the ventilation pad on children's waist is limited.

Therefore, the prior art still needs to be improved and developed.

SUMMARY

In view of the above shortcomings of the prior art, the present disclosure aims to provide a ventilation pad designed to solve the problem that the existing ventilation pad has limited ventilation and cooling effect on the waist of the young child.

To achieve the above purpose, the disclosed technical scheme of the present disclosure is as follows:

A ventilation pad is provided in the present disclosure, wherein the ventilation pad includes a pad body and a ventilation assembly; an air supply chamber is arranged in the pad body, a quantity of vents feed through with the air supply chamber are arranged on the pad body; the ventilation assembly is arranged in the air supply chamber, the ventilation assembly includes downward air outlets and upward air outlets, respectively.

According to the ventilation pad, the ventilation assembly includes:

First fans, air outlets of the first fans are upward;

Second fans, air outlets of the second fans are downward; and the second fans are located between the first fans; and A cover plate configured to fix the first fans and the second fans, the cover plate is provided with air intakes facing the quantity of vents, the number of the air intakes is consistent with the total number of the first fans and the second fans.

According to the ventilation pad, the air supply chamber includes:

A storage chamber configured to accommodate the ventilation assembly;

An upper air supply chamber connected to the upper portion of the storage chamber, and the connection portion between the upper air supply chamber and the storage chamber is located above the air outlets of the first fans;

A lower air supply chamber connected to the lower portion of the storage chamber, and the connection portion between the lower air supply chamber and the storage chamber is located below the air outlets of the second fans.

The ventilation pad further includes:

A thermal resistor arranged in the air supply chamber; and

A control circuit board arranged on the ventilation assembly, and the control circuit board is electrically connected to the ventilation assembly and the thermal resistor.

According to the ventilation pad, the thermal resistor is fixed in the upper air supply chamber.

According to the ventilation pad, the pad body includes an outer fabric layer with the quantity of vents, an inner pad located below the outer fabric layer, and a fixed assembly fixed on the inner pad; the fixed assembly is configured to fix the thermal resistor.

According to the ventilation pad, the ventilation assembly further includes:

A connecting terminal arranged on the control circuit board;

A pallet horizontally configured to support the control circuit board;

two elastic clamping assemblies arranged mirror images of each other; and

A top assembly arranged between the two elastic clamping assemblies, and the top assembly cooperates with the elastic clamping assemblies to hold the connecting terminal.

According to the ventilation pad, a quantity of cable limiting holes are arranged on the cover plate.

According to the ventilation pad, a first zipper is arranged on the pad body, the first zipper is configured to open the storage chamber.

The ventilation pad further includes a cushion portion, the cushion portion is connected to the lower portion of the pad body.

Benefits:

According to the present disclosure, the ventilation assembly is arranged in the air supply chamber, and the ventilation assembly can simultaneously air downwards and upwards when working, so that the pad body 1 has two air outlet directions upwards and downwards at the same time; in some embodiments, when a child's back leans on the ventilation pad, the pad body provides upward air to blow away the heat of the child's back, while the pad body provides downward air can ventilate and radiate the waist and even legs of the child; therefore, compared with the existing ventilation pad products, the ventilation cushion of the present disclosure play a good ventilation and dissipation effect to the back and waist of children at the same time.

Furthermore, by setting the cushion portion under the pad body, the ventilation pad provided by the present disclosure can be used not only in the ventilation back pad but also in the ventilation seat pad.

Figure 1:
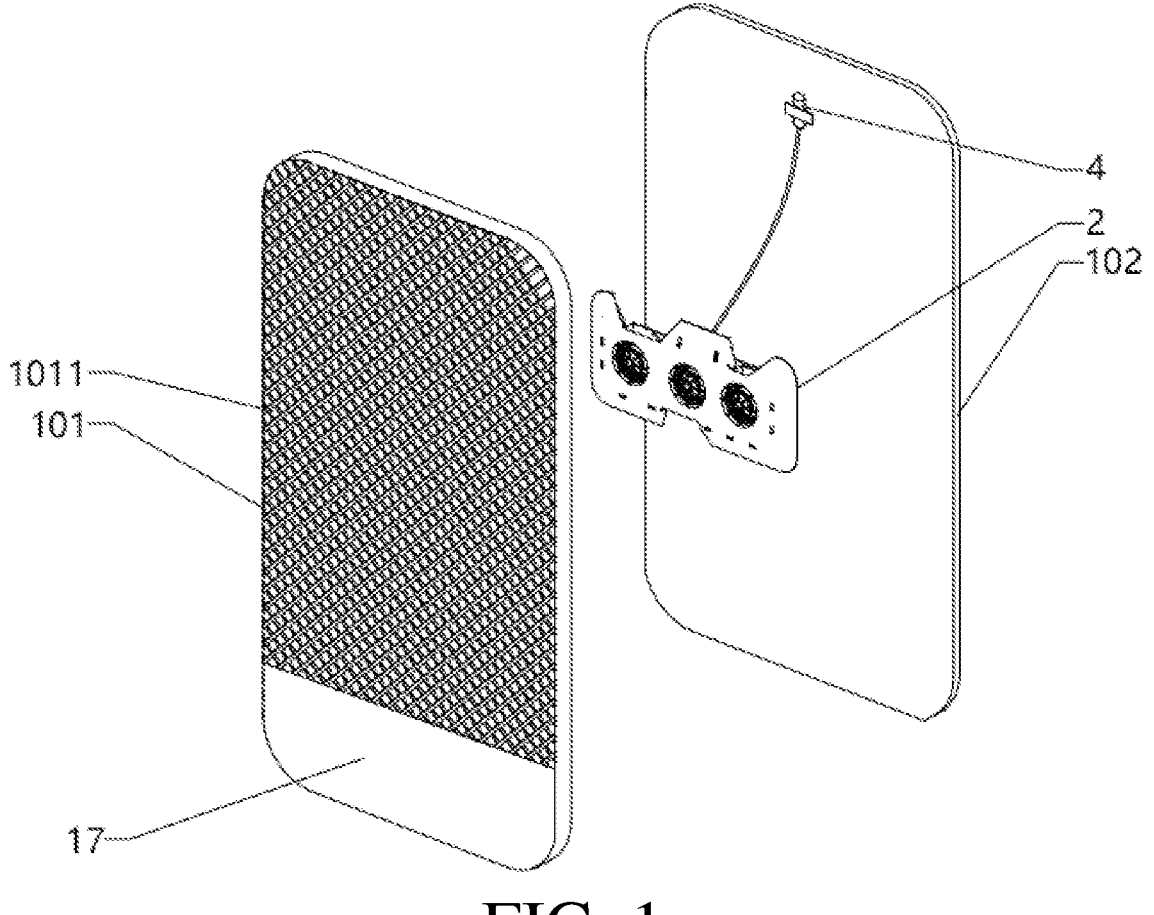
FIG. 1 is a structural split schematic diagram of a ventilation pad according to the present disclosure.

Attached drawing marks: 1—pad body; 101—outer fabric layer;

1011—vent; 102—inner pad; 103—air supply chamber; 1031—upper air supply chamber; 1032—storage chamber; 1033—lower air supply chamber;

2—ventilation assembly; 21—first fan; 22—second fan; 23—cover plate; 231—air intake;

3—first zipper; 4—thermal resistor; 5—control circuit board; 6—second zipper;

71—elastic belt; 72—buckle; 73—clamping portion; 731—clamping groove;

81—connecting plate; 82—sleeve ring; 83—elastic washer;

9—connecting terminal; 10—pallet; 11—elastic clamping assembly; 12—top assembly; 13—cable limiting hole; 14—switch; 15—power line; 16—USB interface; 17—cushion portion.

DETAILED DESCRIPTION OF THE EMBODIMENTS

A ventilation pad is provided in the present disclosure. In order to make the purpose, technical scheme, and effects of the present disclosure clearer and more explicit, the present disclosure is further explained in detail with reference to some embodiments in combination with the accompanying drawings. It should be understood that the specific embodiments described herein are used only to explain the present disclosure and not to limit the present disclosure.

It should be understood that, in the description of the present disclosure, the terms "up", "down", "left", and "right" indicate orientations or positions based on the orientations or positions shown in the drawings, only to facilitate the description of the present disclosure and simplify the description, rather than indicating or implying that the device or element must have a specific orientation and operation, and therefore it cannot be understood as a limitation of the present disclosure. Furthermore, "first" and "second" are used for descriptive purposes only and cannot be understood as indicating or implying relative importance or implicitly indicating the number of technical features indicated. Therefore, features including "first" and "second" may explicitly or implicitly include one or more of the features. In the description of the present disclosure, unless otherwise stated, "multiple" means more than two.

As shown in FIGS. 1-4, a ventilation pad is provided in the present disclosure, wherein the ventilation pad includes a pad body 1 and a ventilation assembly 2; the pad body 1 includes an outer fabric layer 101 with a quantity of vents 1011 and an inner pad 102 located below the outer fabric layer 101; the outer fabric layer 101 and the inner pad 102 are connected, thus an air supply chamber 103 is formed between the outer fabric layer 101 and the inner pad 102; the quantity of vents 1011 and the air supply chamber 103 are feed through; and the ventilation assembly 2 is arranged in the air supply chamber 103; optionally, the ventilation assembly 2 is arranged in the air supply chamber 103, and the ventilation assembly 2 includes downward air outlets and upward air outlets, respectively.

According to the present disclosure, the ventilation assembly 2 is arranged in the air supply chamber 103, and the ventilation assembly 2 can simultaneously air downwards and upwards when working so that the pad body 1 has two air outlet directions upwards and downwards at the same time; in some embodiments, when a child's back leans on the ventilation pad, the pad body 1 provides upward air to blow away the heat of the child's back, while the pad body 1 provides downward air, which can ventilate and radiate the waist and even legs of the child; therefore, compared with the existing ventilation pad products, the ventilation pad of the present disclosure play a good ventilation and dissipation effect to the back and waist of children at the same time.

Figure 2:
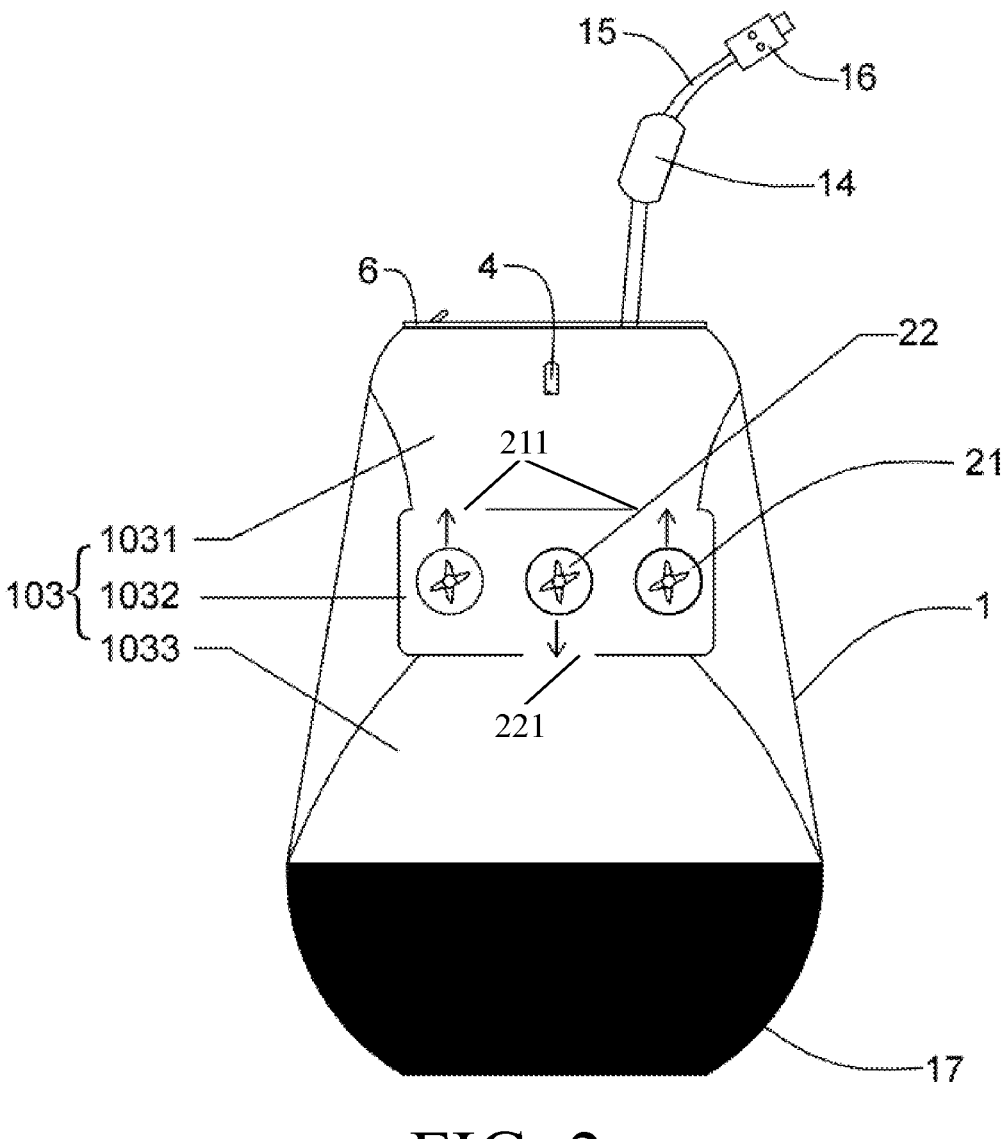
FIG. 2 is a working schematic diagram of the ventilation pad according to the present disclosure.
Figures 4, 5:
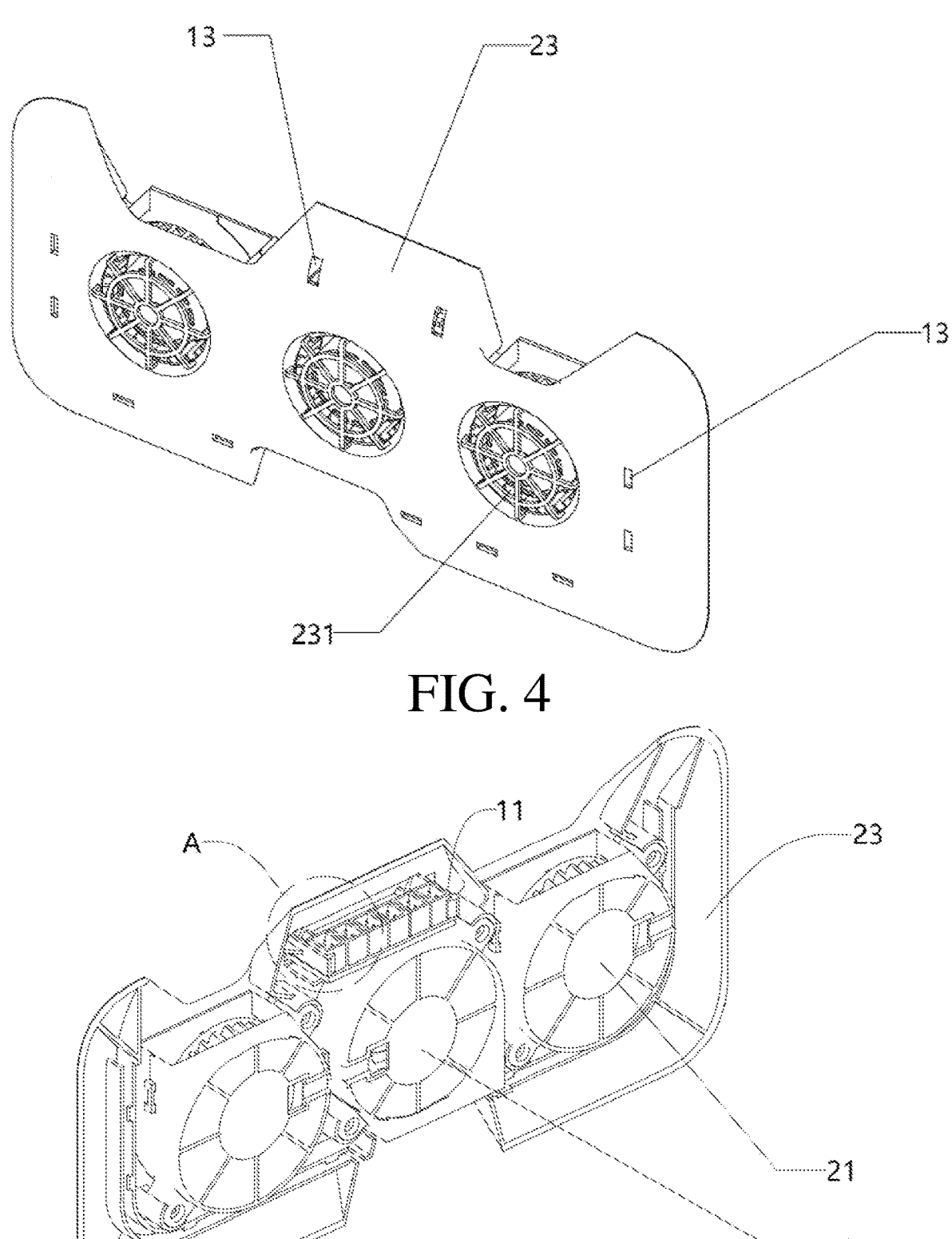
FIG. 4 is a structural schematic diagram of a ventilation assembly according to an embodiment of the present disclosure.
FIG. 5 is a structural schematic diagram of the ventilation assembly according to an embodiment of the present disclosure.

As shown in FIGS. 2, 4, and 5, in one embodiment, the ventilation assembly 2 includes first fans 21, a second fan 22 and a cover plate 23; optionally, the first fans 21 and the second fan 22 are turbofan, wherein the air outlets 211 of the first fans 21 are upward, the air outlet 221 of the second fan 22 is downward, and the second fan 22 is located between the first fans 21; the cover plate 23 is used for fixing the first fans 21 and the second fan 22, and the cover plate 23 is provided with air intakes 231 facing the quantity of vents 1011, the number of the air intakes 231 is consistent with the total number of the first fans 21 and the second fan 22. The air intakes 231 are configured to ensure that the air flows on the front and back sides of the first fans 21 and the second fan 22, and the first fans 21 and the second fan 22 can vent the air normally.

Since the air is subject to gravity, when the air is blown up from the first fans 21 by gravity, the flow of the wind is hindered. In a preferred embodiment of the present disclosure, the number of the first fans 21 is greater than the number of the second fans 22, ensuring that the air volume of the ventilation assembly 2 is sufficient so that the ventilation pad can have a good ventilation heat dissipation effect on the back of the child.

Figure 3:
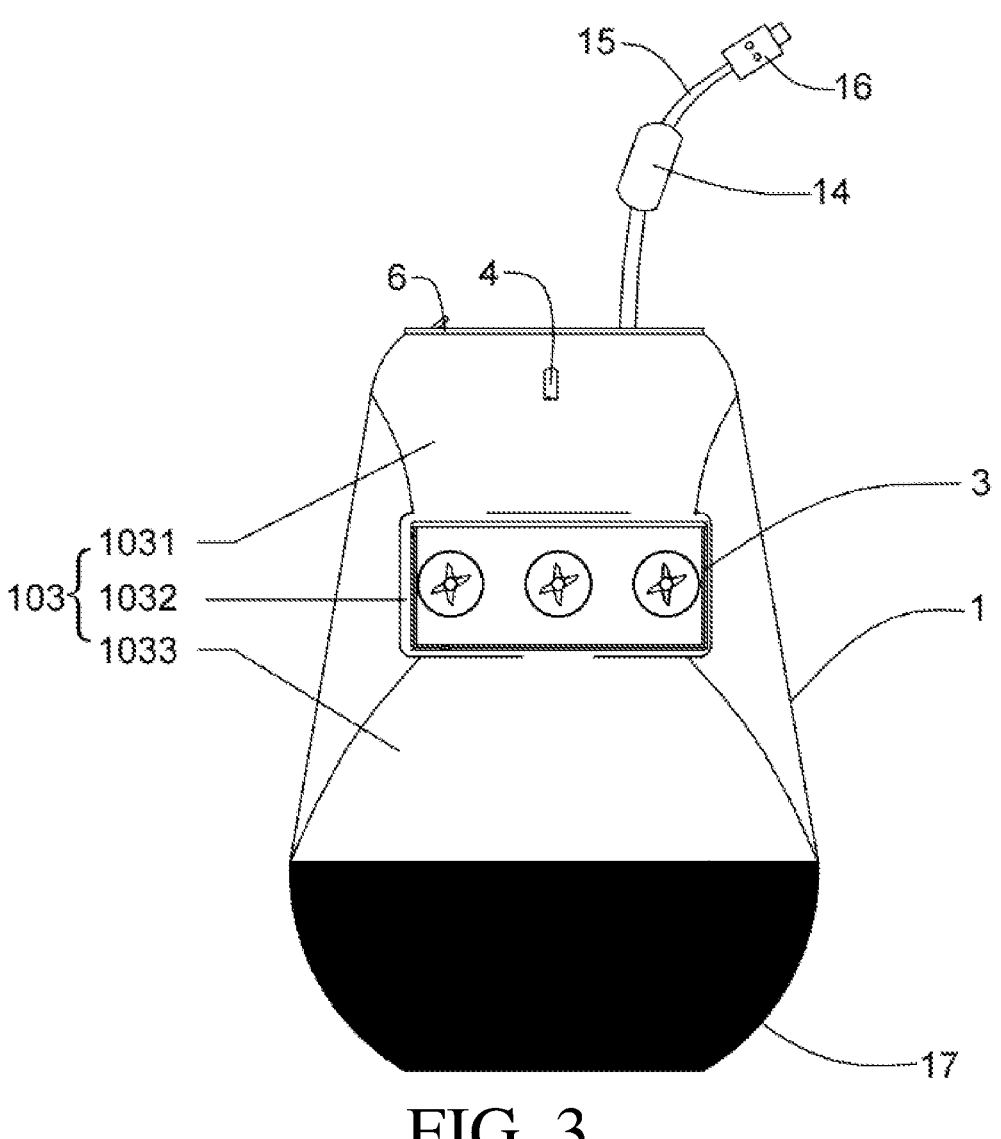
FIG. 3 is a brief structural schematic diagram of the ventilation pad according to the present disclosure.

As shown in FIGS. 2-3, in one embodiment, the air supply chamber 103 includes an upper air supply chamber 1031, a storage chamber 1032, and a lower air supply chamber 1033. The storage chamber 1032 is configured to accommodate the ventilation assembly 2; the upper air supply chamber 1031 is connected to the upper portion of the storage chamber 1032, and the connection portion between the upper air supply chamber 1031 and the storage chamber 1032 is located above the air outlets of the first fans 21. The lower air supply chamber 1033 is connected with the lower portion of the storage chamber 1032, and the connection portion between the lower air supply chamber 1033 and the storage chamber 1032 is located below the air outlets of the second fans 22.

In the embodiment, the interconnection portion between the storage chamber 1032 with the upper air supply chamber 1031 and the lower air supply chamber 1033 is fixed on the pad body by seaming. Thus the storage chamber 1032 can be used for fixing the ventilation assembly 2, when the ventilation assembly 2 is accommodated in the storage chamber 1032. The connection portion between the upper air supply chamber 1031 and the storage chamber 1032 is located above the air outlets of the first fans 21, and the connection portion between the lower air supply chamber 1033 and the storage chamber 1032 is located below the air outlets of the second fans 22, which make sure that the ventilation assembly 2 is fixed and does not affect the normal air outlet of the pad body 1.

As shown in FIG. 3, in one embodiment, a first zipper 3 is arranged on the pad body 1; the first zipper 3 is configured to open the storage chamber 1032 to facilitate the user to maintain or replace the fan assemblies.

As shown in FIGS. 1-3, in one embodiment, the ventilation pad further includes a thermal resistor 4 and a control circuit board 5; optionally, the type of the thermal resistor 4 is ZT-NTC-03, and the thermal resistor 4 is arranged in the air supply chamber 103; the control circuit board 5 is arranged on the ventilation assembly 2, the control circuit board 5 is electrically connected to the ventilation assembly 2 and the thermal resistor 4. The thermal resistor 4 is configured to obtain the ambient temperature information on the back of young children and feedback to the control circuit board 5, thus adjusting the air volume of the ventilation assembly 2 (that is, adjusting the rotation speed of the first fans 21 and the second fans 22).

The present disclosure is configured to automatically adjust the air volume of the ventilation assembly 2 based on the ambient temperature information on the back of young children, which not only can ensure that children's back and waist can get good heat dissipation but also when the environment is low, children will not catch cold because of the large air volume out of the ventilation pad.

Optionally, the thermal resistor 4 is fixed in the upper air supply chamber 1031 to make it convenient for the connection of the thermal resistor 4 and the control circuit board 5.

As shown in FIGS. 2-3, optionally, a second zipper 6 is configured on the upper portion of the pad body 1 to make it convenient for fixing the thermal resistor 4 in the upper air supply chamber 1031. The second zipper 6 is used for connecting an outer fabric layer 101 and an inner pad 102. Meanwhile, when the second zipper 6 is opened, the upper air supply chamber 1031 can be opened, which is easy to configure the thermal resistor 4.

In one embodiment, the pad body 1 further includes a fixed assembly; the fixed assembly is fixed on the inner pad 102 by the bond, suture, etc.; and the fixed assembly is used to fix the thermal resistor 4.

Figure 7:
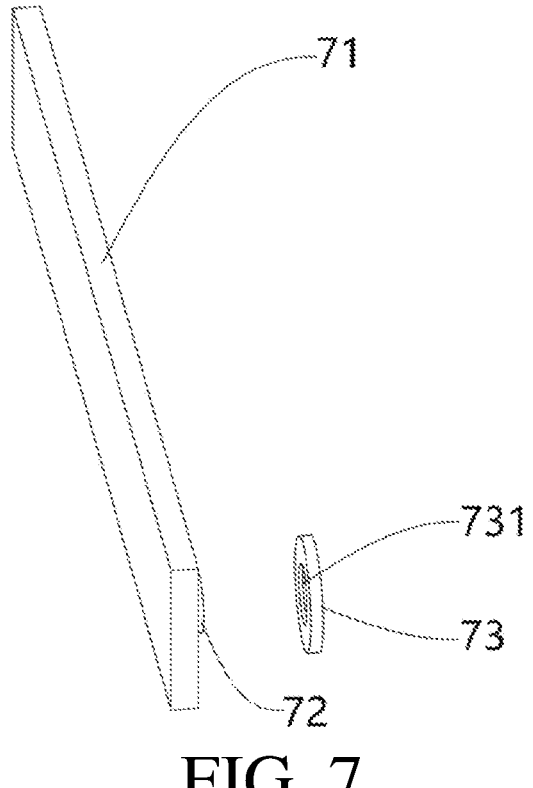
FIG. 7 is a structural schematic diagram of a fixed assembly according to an embodiment of the present disclosure.

As shown in FIG. 7, in one embodiment, the fixed assembly includes an elastic belt 71, a buckle 72, and a clamping portion 73 fitted with the buckle 72; the clamping portion 73 includes a clamping groove 731 fitted with the buckle 72; the clamping portion 73 is fixed on the inner pad 102; one end of the elastic belt 71 is fixed on the inner pad 102, and the other end of the elastic belt 71 is configured to fix the buckle 72.

In the embodiment, when the buckle 72 is attached to the clamping portion 73, the elastic belt 71 is in a stretched state, so the thermal resistor 4 can be quickly fixed to the inner pad 102 with the help of the elastic belt 71.

Figure 8:
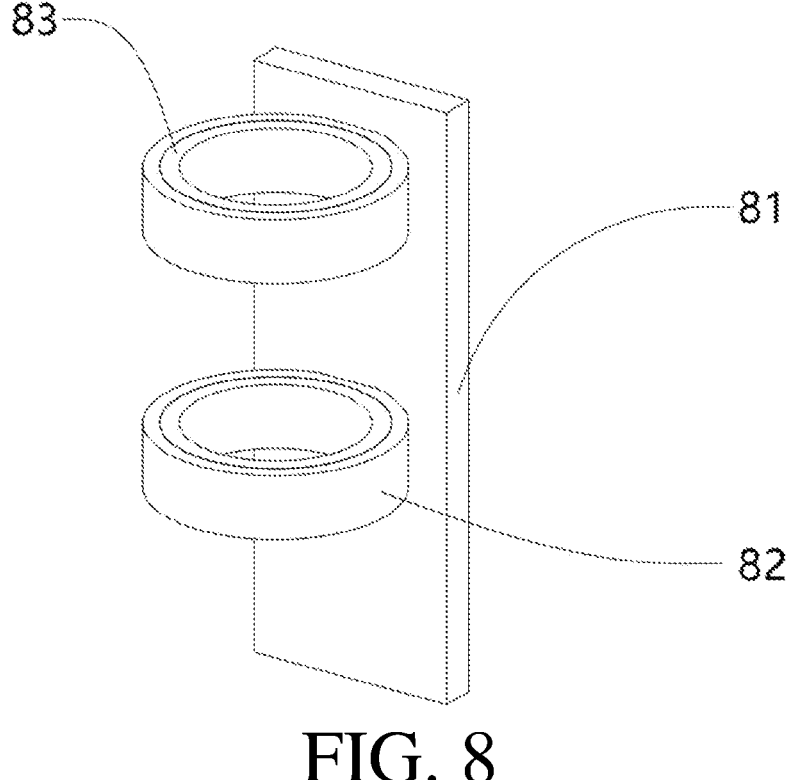
FIG. 8 is a structural schematic diagram of the fixed assembly according to an embodiment of the present disclosure.

As shown in FIG. 8, another embodiment of the fixed assembly is provided in the present disclosure. Specifically, the fixed assembly includes a connecting plate 81, a sleeve ring 82, and an elastic washer 83; the connecting plate 81 is fixed on the inner pad 102; the sleeve ring 82 is configured in front of the connecting plate 81; and the elastic washer 83 is configured in the sleeve ring 82 to card the thermal resistor 4. In the embodiment, the sleeve ring 82 is configured, and the elastic washer 83 configured in the sleeve ring 82 is used to card the thermal resistor 4. When the thermal resistor 4 is configured in the elastic washer 83, the elastic washer 83 is in a compressed state, and in order to recover, the elastic washer 83 restores the opposite force on the thermal resistor 4, thus ensuring that the thermal resistor 4 does not fall off from the fixed assembly.

Figure 6:
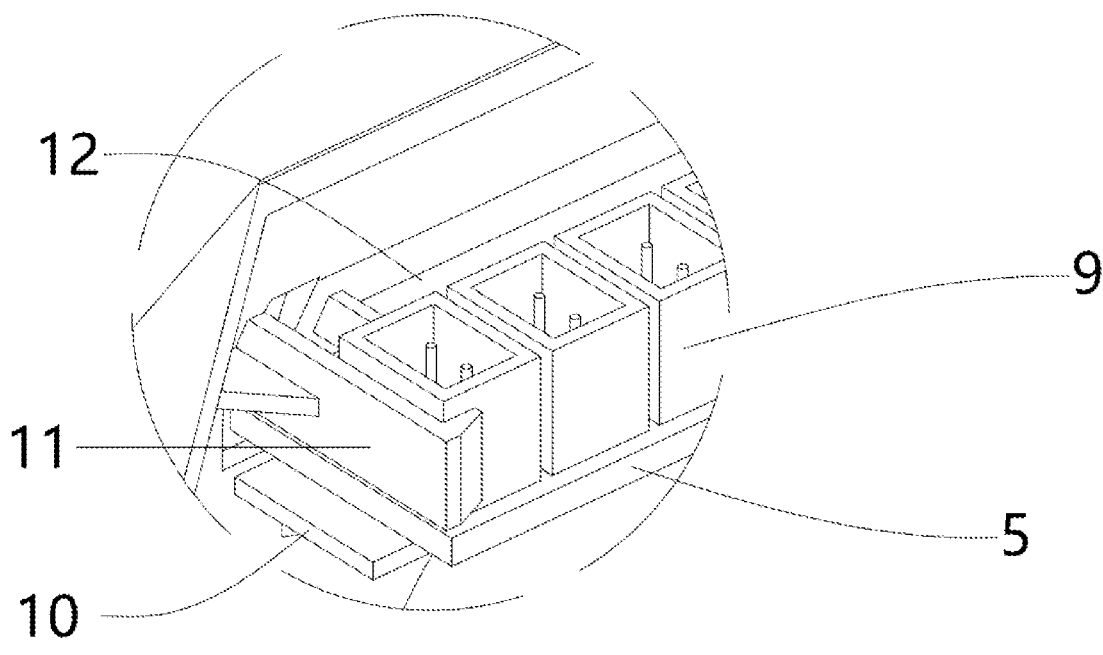
FIG. 6 is an enlarged view of portion A in FIG. 5.

As shown in FIGS. 5-6, in one embodiment, the ventilation assembly 2 further includes a connecting terminal 9, a pallet 10, an elastic clamping assembly 11, and a top assembly 12. The connecting terminal 9 is arranged on the control circuit board 5 and is connected with a power line 15 for supplying power to the control circuit board 5 and the like; the pallet 10 is horizontally arranged on the inner side of the cover plate 23 for supporting the control circuit board 5; two elastic clamping assemblies 11 are connected with the inner side of the cover plate 23, and the two elastic clamping assemblies 11 are mirror images of each other. The top assembly 12 is arranged between two elastic clamping assemblies 11, and the top assembly 12 cooperates with the hook at one end of the elastic clamping assemblies 11 to hold the connecting terminal 9. In the embodiment, the connecting terminal 9 and the control circuit board 5 are firmly installed on the cover plate 23 through the mutual cooperation of the pallet 10, the two elastic clamping assemblies 11, and the top assembly 12, so as to ensure the normal operation of the ventilation assembly 2.

As shown in FIG. 4, in one embodiment, a quantity of cable limiting holes 13 are arranged on the cover plate 23. Cables connected to the first fan 21 or the second fan 22 passes through the quantity of cable limiting holes 13 and then are connected to the connecting terminal 9, so the quantity of cable limiting holes 13 can play the role of regular cables, which can not only reduce the potential safety hazard when the ventilation assembly 2 is used but also ensure the normal operation of the ventilation assembly 2.

As shown in FIGS. 2-3, in one embodiment, a switch 14 is arranged on a power line 15 for powering the control circuit board 5 and the like; optionally, an LED lamp may be arranged on the switch 14 indicating the operating state of the ventilation pad.

As shown in FIGS. 2-3, in one embodiment, the power line 15 includes a USB interface 16. In this way, the ventilation pad is a power supply with the help of the charging bank, without the need to make a lot of changes to the children's car seats, child carts, infant dining chairs and other baby products, so as to facilitate the promotion and use of the ventilation mat.

As shown in FIGS. 1-3, in one embodiment, the ventilation pad further includes a cushion portion 17, and the cushion portion 17 is connected to the lower portion of the pad body 1. In this way, the ventilation pad provided by the present disclosure can be used not only in the ventilation back pad but also in the ventilation seat pad.

The ventilation pad provided by the present disclosure can be used on small infant products, such as infant dining chairs, and for large infant products, including child car chairs, sewing or zipper at the same time on child products and ventilation pads.

In summary, a ventilation pad is provided in the present disclosure, by placing the ventilation assembly in the air supply chamber of the pad body and making the ventilation assembly can work down and upward air at the same time, so that the pad body with both upward and downward air directions. When the child's back is on the ventilation pad, the pad body up the wind blows away the heat of the child's back, and the pad down the wind can ventilate and heat the children's waist and even legs, therefore, compared with the existing ventilation cushion products, the ventilation pad provided by the present disclosure can have good ventilation and cooling effects on the children's back and waist.

Furthermore, by setting the cushion portion under the pad body, the ventilation pad provided by the present disclosure can be used not only in the ventilation back pad but also in the ventilation seat pad.

It should be understood that one of ordinary skill in the field may be equally replaced or changed according to the technical scheme of the present disclosure and the present disclosure thereof, and all such changes or replacements shall fall within the protection of the claims attached to the present disclosure.

What is claimed is:

1. A ventilation pad having a pad body and a ventilation assembly, comprising:
  an air supply chamber arranged in the pad body; and
  a quantity of vents feed through with the air supply chamber, the quantity of vents are arranged on the pad body;
  wherein the ventilation assembly is arranged in the air supply chamber; and
  the ventilation assembly comprises:
  first fans, air outlets of the first fans are upward;
  a second fan, an air outlet of the second fan is downward, and the second fan is located between the first fans; and
  a cover plate, the cover plate is configured to fix the first fans and the second fan, and air intakes facing the quantity of vents are arranged on the cover plate, the number of the air intakes is consistent with the total number of the first fans and the second fan.

2. The ventilation pad according to claim 1, wherein the air supply chamber comprises:
  a storage chamber configured to accommodate the ventilation assembly;
  an upper air supply chamber connected to the upper portion of the storage chamber, the connection portion between the upper air supply chamber and the storage chamber is located above the air outlets of the first fans; and
  a lower air supply chamber connected to the lower portion of the storage chamber, the connection portion between the lower air supply chamber and the storage chamber is located below the air outlet of the second fan.

3. The ventilation pad according to claim 2, wherein a first zipper is arranged on the pad body, the first zipper is configured to open the storage chamber.

4. The ventilation pad according to claim 1, wherein the ventilation pad further comprises:
  a thermal resistor arranged in the air supply chamber; and
  a control circuit board arranged on the ventilation assembly, the control circuit board is electrically connected to the ventilation assembly and the thermal resistor.

5. The ventilation pad according to claim 2, wherein the ventilation pad further comprises:
  a thermal resistor arranged in the air supply chamber; and
  a control circuit board arranged on the ventilation assembly, the control circuit board is electrically connected to the ventilation assembly and the thermal resistor; and
  the thermal resistor is fixed in the upper air supply chamber.

6. The ventilation pad according to claim 4, wherein the pad body comprises an outer fabric layer with the quantity of vents, an inner pad located below the outer fabric layer, and a fixed assembly fixed on the inner pad; the fixed assembly is configured to fix the thermal resistor.

7. The ventilation pad according to claim 4, wherein the ventilation assembly further comprises:
  a connecting terminal arranged on the control circuit board;
  a pallet configured to support the control circuit board;
  two elastic clamping assemblies arranged mirror images of each other; and
  a top assembly arranged between the two elastic clamping assemblies, the top assembly cooperates with the two elastic clamping assemblies to hold the connecting terminal.

8. The ventilation pad according to claim 7, wherein a quantity of cable limiting holes are arranged on the cover plate.

9. The ventilation pad according to claim 1, wherein the ventilation pad further comprises a cushion portion, the cushion portion is connected to the lower portion of the pad body.

* * * * *